3,238,057
METHOD FOR COATING ACTINIDE OXIDE
PARTICLES USING ZIRCONIA SOLS
Frederick T. Fitch, Baltimore, and Ann B. Braun, Rockville, Md., assignors to W. R. Grace & Co., New York, N.Y., a corporation of Connecticut
No Drawing. Filed Aug. 30, 1963, Ser. No. 305,877
7 Claims. (Cl. 117—100)

This invention relates to a method of preparing zirconia coated ceramic powders of actinide oxides, mixtures of actinide oxides, and solid solution systems of actinide oxides with rare earth oxides, zirconia, and related componds. In one specific embodiment it relates to a method of preparing hydrous zirconia coatings on the surfaces of micron size ceramic powders of actinide oxides, mixtures of actinide oxides and solid solution systems of actinide oxides with rare earths and zirconia.

In recent years, oxides of the actinide metals have become of paramount importance in the field of nuclear fuel development. These oxides may be used in the form of pellets or may be in the form of irregular granules which can be packed to a high density by swaging or vibratory techniques. Uranium dioxide is one of the better known oxide nuclear fuels. Uranium dioxide has a disadvantage in that it is subject to oxidation, and the resulting phase changes disrupt the ceramic elements. In gas fuel reactors and high temperature applications, there are the additional disadvantages of fuel loss to the volatility of the uranium and the release of fission products.

The disadvantages inherent in uranium dioxide ceramic fuel elements have been overcome with the recent development of coating techniques. Ceramic powders of urania and more complex urania-metal oxide systems are used to form high temperature nuclear oxide ceramic elements by compacting and sintering processes. Zirconia coating on these powder particles improve the properties of the nuclear elements with regard to strength, fuel oxidation, retention of urania and fission products.

We have found that micron size powders of actinide oxides, mixtures of these oxides and solid solution systems of actinide oxides with rare earths and zirconia can be coated with zirconia in a process which comprises chemically activating the surfaces of the particles, adding a quantity of a dilute solution of a zirconium salt sufficient to give a weight ratio of zirconia to actinide metal powder of about 0.1 to 1 to 0.4 to 1, adding sufficient cation exchange resin to maintain the pH of the system between 5 and 7, separating the mixture from the resin, autoclaving and recovering the zirconia coated particles.

The method of preparing the ceramic powders used as a raw material in the process of our invention is not part of this invention. These powders can be prepared by high temperature calcination.

The process of our invention is useful for coating micron size particles. Particles in the size range of 1 to 6 microns can be coated successfully. Particularly good results are achieved when coating particles in the 1 to 5 micron size range.

The first step of our process is the pretreatment of the powders to be coated. The powders can be activated by treatment with a solution of a strong mineral acid. Any of the strong minerals, such as hydrochloric, nitric, sulphuric, etc., give satisfactory results. The powders are treated with the acid by stirring in a solution of the acid in the concentration of 0.01 to 0.1 normal. Alternately, the powders can be activated by treatment with a surface active agent. Particularly useful agents are the high molecular weight polymers which are soluble and which have a repeating unit containing reactive amine and carboxylic acid groups or amide groups. These materials are extremely reactive with heavy metal ions and colloidal oxide surfaces. At part per million concentrations, these reagents are effective flocculating agents for slimes and colloids, both by reaction between the surfaces of the several particles and by reducing the surface changes.

In the process of our invention, these surface active agents are used in part per billion concentrations. The agents attach themselves to the powder particles surfaces and subsequently react with the colloidal zirconia to insure coating.

Particularly good results were achieved using the surface active agent, sold by Dow Chemical Company as a trade name "Separan NP 10." This material is a non-ionic, water soluble, polyacrylamide flocculating agent.

The process of our invention is normally carried out at atmospheric pressure. However, under certain conditions, pressures below or above atmospheric may be used. Atmospheric pressure is obviously preferable for economic reasons.

The process of our invention is carried out at a temperature of 60 to 90° C., the preferred temperature being about 80° C. Temperatures above 90° C. give too rapid hydrolysis leading to precipitation of hydrous zirconia rather than colloidal particle formation.

The ceramic powders useful for coating in the process of our invention are dispersed in an aqueous medium in a concentration of about 0.5 to 3% solids, preferred concentration being 0.5 to 1% solids. The treatment of the particles with the surface active agents or with the acid pre-treatment is facilitated by stirring the slurry of particles with the treating agent at a temperature of about 80° C. for a period of time in the order of about 10 to 15 minutes.

In the process of our invention, the temperature of the solution is maintained and hydrogen form cation exchange resin is added. Any of the commercial available cation exchange resins can be used in this step of the process of our invention. We have found that we get good results with the commercially available Dowex-50 cation exchange resin in hydrogen form.

In this step of the process, the cation exchange resin is added in a concentration of about one tenth of solution and additional resin is added as needed to maintain the pH between 5 and 7. In the next step of the process, the mixture is maintained at elevated temperature and the zirconia compound is added in a concentration of zirconia to ceramic powder in the weight ratio of 0.1 to 0.4. Suitable zirconium salts for use in this step of the process include zirconyl chloride, ammonium zirconium carbonate, or other zirconyl salts which will hydrolyze slowly in aqueous solution by heating or by removal of ions by ion exchange.

The reaction is carried out for a period of 1 to 3 hours. The reaction is essentially complete in most cases in about 1 hour. After the reaction is complete, the slurry is separated from the ion exchange resin and autoclaved. The autoclaving can be carried out at a temperature of 120 to 180° C. for a period of 5 to 20 hours. Satisfactory results are obtained when the slurry is autoclaved at a temperature of about 150° C. for a period of 10 to 20 hours.

The product recovered from this process may be examined with an electron microscope to check the quality and regularity of the zirconia coating on the surface of the particles.

The invention is further illustrated by the following specific but non-limiting example.

Example I

A solution of the surface active agent to be used to pretreat the particle was prepared to contain 1 mg. per liter. The surface active agent was a high molecular weight polymer with a repeating unit containing reactive amine and carboxylic groups (sold under the trade name "Separan NP 10"). A 0.25 ml. portion of the solution was added to 215 ml. of water at 80° C. Two grams of urania-yttria ceramic powder (containing about 55 weight percent urania, 45 weight percent yttria) was added to the solution. The particle size of the ceramic powder was principally 1 to 5 microns. The mixture was blanketed with a protective nitrogen atmosphere and stirred for 10 minutes. At the end of this time 25 ml. of wet cation exchange resin (Dowex–50) in hydrogen form was added and 20 ml. of an ammonium zirconium carbonate solution $((NH_4)_2Zr(CO_3)_3)$ was slowly stirred into the solution over a period of an hour while the temperature was maintained at 80° C. Small portions of the resin were added as required to maintain a pH of 5 to 7. At this stage in the reaction the specific conductance of the system was $10^{-5}$ mhos per cm.

The powder suspension was then removed from the settled resin and the powder was dispersed in water at its original concentration and autoclaved at 150° C. for 20 hours under nitrogen. At the end of this time the product was examined under an electron microscope. The particles were of the size and shape relating to the starting urania-yttria powder and had the surface appearance and structure resembling that of colloidal zirconia. Some of the coated particles appeared to contain more than one urania-yttria powdered particle. Thus there was some increase in the size range of the particles. The electron diffraction pattern had several colloidal particles that matched that of the yttria-urania powder, which confirmed presence of the yttria-urania within the coating.

What is claimed is:

1. A process for coating micron size particles selected from the group consisting of actinide oxides, mixtures of actinide oxides, solid solution systems of actinide oxides with rare earth oxides and solid solution systems of actinide oxides with zirconia with hydrous zirconia which comprises pretreating the particles with a very dilute solution of a soluble high molecular weight polymer with a repeating unit containing amine and carboxylic groups, adding a quantity of a dilute solution of a zirconium salt sufficient to give a zirconia to actinide metal weight ratio of about 0.1 to 1 to 0.4 to 1, adding sufficient cation exchange resin to maintain the pH of the system between 5 and 7, separating the mixture from the resin, autoclaving the resin free mixture and recovering the zirconia coated particles.

2. The process according to claim 1 wherein the zirconium salt is ammonium zirconium carbonate.

3. The process according to claim 1 wherein the ammonium salt is zirconyl chloride.

4. A process for coating micron size powders selected from the group consisting of urania, solid solution systems of urania with rare earth oxides and solid solution systems of urania with zirconia with hydrous zirconia which comprises chemically activating the surface of the powders with dilute hydrochloric acid at a temperature of about 80° C., adding a sufficient quantity of a dilute solution of ammonium zirconium carbonate to provide a zirconia to urania weight ratio of about 0.1 to 0.4, adding sufficient cation exchange resin to maintain the pH between 5 and 7, separating the slurry from the ion exchange resin, autoclaving the resin free mixture and recovering the zirconia coated powder particles.

5. A process for coating powders selected from the group consisting of urania, solid solution systems of urania with rare earth oxides and solid solution systems of urania with zirconia in the size range of 1 to 5 microns which comprises chemically activating the surface of the powders with a dilute hydrochloric acid solution at a temperature of about 80° C., adding a sufficient quantity of a dilute solution of ammonium zirconium carbonate to provide a zirconia to urania weight ratio of about 0.1 to about 0.4, adding sufficient cation exchange resin to maintain the pH between 5 and 7, separating the slurry from the ion exchange resin, autoclaving the resin free mixture at a temperature of about 150° C. for about 10 to 20 hours and recovering the zirconia coated powder particles.

6. The process for coating powders selected from the group consisting of urania, solid solution systems of urania with zirconia, and solid solution systems of urania with rare earth oxides in the size range of about 1 to 5 microns, which comprises preparing a solution of a soluble high molecular weight polymer with a repeating unit containing amine and carboxylic acid groups in the part per billion concentration range, heating to a temperature of about 80° C., adding the powder particles to be coated as an aqueous slurry containing about 1% solids, adding sufficient ammonium zirconium carbonate to provide a zirconia to urania weight ratio of 0.1 to 0.4, adding sufficient cation exchange resin to maintain the pH between 5 and 7, separating the slurry, autoclaving the resin free mixture and recovering the zirconia coated powder particles.

7. A process for coating powders selected from the group consisting of urania, solid solution systems of urania with zirconia, and solid solution systems of urania with rare earth oxides in the size range of about 1 to 5 microns, which comprises preparing a solution of a soluble high molecular weight polymer with a repeating unit containing amine and carboxylic acid groups in the part ber billion concentration range, heating to a temperature of about 60 to 90° C., adding the micron size powders to be coated as an aqueous slurry containing about 1% solids, adding sufficient ammonium zirconium carbonate solution to provide a zirconia to urania weight ratio of between 0.1 and 0.4, adding sufficient cation exchange resin to maintain the pH between 5 and 7, autoclaving the resin free mixture at a temperature of about 150° C. for about 10 to 20 hours and recovering the zirconia coated powder particles.

References Cited by the Examiner

UNITED STATES PATENTS

| | | | |
|---|---|---|---|
| 1,235,603 | 5/1960 | France | 176—69 |
| 2,779,966 | 1/1957 | Langworthy | 117—169 X |
| 2,920,003 | 1/1960 | Davis | 117—221 X |
| 3,081,249 | 3/1963 | Whittemore | 264—.5 |
| 3,097,175 | 7/1963 | Barrett et al. | 252—301.1 |
| 3,129,093 | 4/1964 | Alexander et al. | 117—100 |
| 3,150,100 | 9/1964 | Fitch et al. | 252—301.1 |
| 3,157,601 | 11/1964 | Fitch et al. | 252—301.1 |
| 3,169,865 | 2/1965 | Wood | 117—169 |
| 3,175,922 | 3/1965 | Blochen et al. | 117—FB |

WILLIAM D. MARTIN, *Primary Examiner.*

GRANT L. HUBBARD, *Examiner.*